United States Patent [19]

Martinez et al.

[11] Patent Number: 5,264,257
[45] Date of Patent: Nov. 23, 1993

[54] GLASS COMPOSITE SHEATHING BOARD

[75] Inventors: Steven R. Martinez; Christopher P. Sandoval, both of Littleton; Don A. Forte, Evergreen; Donald R. Steinle, Littleton, all of Colo.; Frank A. McCampbell, Willows, Calif.

[73] Assignee: Manville Corporation, Denver, Colo.

[21] Appl. No.: 694,260

[22] Filed: Apr. 29, 1991

[51] Int. Cl.⁵ .................. B32B 5/16; B32B 17/02
[52] U.S. Cl. ........................ 428/2; 106/675; 106/698; 106/DIG. 2; 264/257; 428/15; 428/903.3
[58] Field of Search ............... 162/171; 106/675, 698, 106/DIG. 2; 428/2, 15, 903.3; 264/257

[56] References Cited

U.S. PATENT DOCUMENTS

| | | | |
|---|---|---|---|
| 3,042,578 | 7/1962 | Denning | 162/171 |
| 3,725,185 | 4/1973 | Curtis | 428/236 |
| 4,011,183 | 3/1977 | Ruff | 521/122 X |
| 4,126,512 | 11/1978 | Hill | 162/171 |

*Primary Examiner*—Henry F. Epstein
*Attorney, Agent, or Firm*—Cornelius P. Quinn

[57] ABSTRACT

An insulating board is provided in which the capacity to absorb the moisture exemplified by wood fiber based board, cellulose fiber based board and perlite based board is coupled with the high permeability of fiberglass insulation to provide a board having a balance between the capacity to hold moisture and sufficient permeance to allow the board to give up the moisture as the board is passed through a cycle of absorption and desorption, whether it be on a daily or seasonable cycle.

9 Claims, No Drawings

GLASS COMPOSITE SHEATHING BOARD

FIELD OF THE INVENTION

This invention relates to an improved insulating sheathing board primarily directed to residential home construction and more particularly to a sheathing board with improved insulating and breathability properties.

BACKGROUND OF THE INVENTION

As a result of steadily rising energy costs construction practices in residential housing have changed considerably inasmuch as residential dwellings are now more heavily insulated and usually contain high "R" value sheathing. As is well known in the industry, the "R" value of a material is a term used in connection with the performance of insulation and is determined by dividing the thickness of insulation by its thermal conductivity. The application of high "R" value sheathing which usually has low permeance has caused concern as a result of the changing moisture patterns that may occur in the wall. Excessive moisture in wall cavities can produce detrimental/destructive effects. The moisture may decrease the effectiveness of the cavity insulation and if a wall cavity remains wet for extended periods may result in the decaying and rotting of wood components of the wall. Under winter conditions condensation tends to accumulate on the insulation/sheathing or siding. The outdoor temperature and indoor humidity are the critical values. Indoor moisture moves toward the drier outdoors and will condense if the sheathing or siding are below the dew point temperature. This condensation may result in the buckling or warping of the siding or the blistering or peeling of the paint on the siding. Walls having higher "R" values have colder outside surfaces with greater condensation potential. The lower perm values of these walls also results in less moisture movement and consequently less opportunity for moisture to disipate through vapor diffusion.

Where the source of moisture is external, rain water or surface condensation (dew) penetrates the siding under the influence of the wind and capillary action which can pull surface water on the siding exterior up between the horizontal laps of the siding. The moisture can then migrate from between the laps of the siding and the siding/building paper interface both towards the exterior (into the wood siding towards the paint/finish siding interface) when a sheathing of relatively low permeability is used and towards the interior (into the sheathing material) when a sheathing of relatively high permeability is used.

Absorption of water into sheathing material of wood fiber based board, cellulose fiber based board and perlite based board not only lowers the "R" value but causes dimensional instability in the board as well. Dimensional instability in the board in turn causes the sheathing to warp, buckle and pull away from the nails holding it in place and in many instances may result in the total failure of the product.

Condensation occurs typically at a marked change of permeance such as at the interface of two different materials where these materials are below the dew point temperature. It is not significant that the two materials may be both highly permeable to water vapor, only that they are each of differing permeability. An example of this is when a spun bound olefin film covers fiber glass insulation on the cold side of a wall. The film is "permeable" however the fiber glass insulation is more permeable and condensation occurs at the film/insulation interface. How much moisture accumulates is dependent on the potential for evaporation at that interface. Consequently, at cold temperatures considerable moisture may collect with resulting damage to components of the wall if the moisture is allowed to remain there for extended periods of time. A difficulty with sheathing such as asphalt coated wood fiber based board, cellulose fiber based board, and asphalt coated perlite board, is their relatively low permeance. While these materials have a relatively large capacitance to accumulate moisture their relatively low permeability prevents them from giving up the moisture as the wall passes through its climatic cycle whether it be daily or seasonal and as a result the wall never has the opportunity to completely dry.

Thus, there has existed a definite need for an insulating board which in addition to having sufficient capacity to accumulate moisture has sufficiently high permeance to permit the moisture to escape the board under proper conditions.

It is an object of this invention to provide a new and improved insulation board that will meet these needs of capacitance and high permeance and yet provide improved R values.

It is another object of this invention to provide an insulating board having greater dimensional stability than comparable insulating boards.

Still another object of the present invention is to provide an insulating board having superior flame and smoke life safety characteristics.

Yet another object of the present invention is to provide an insulating board that possesses lower thermal conductivity (or higher "R"/inch) than previously attainable in insulation boards of comparable density.

Additional objects and advantages of the invention will be set forth in part in the description, or may be evident by the practice of the invention.

BRIEF SUMMARY OF THE INVENTION

The present invention is a composite material insulating board in which the capacity to absorb the moisture exemplified by wood fiber based board, cellulose fiber based board and perlite based board is coupled with the high permeability of fiberglass insulation to provide a board having a balance between the capacity to hold moisture and sufficient permeance to allow the board to give up the moisture as the board is passed through a cycle of absorption and desorption, whether it be on a daily or seasonable cycle.

The board which has a nominal density of 10-35 pounds per cubic foot (pcf.) is produced from a homogeneous slurry of 0-40 percent by weight of perlite; 25-50 percent cellulose fiber; 5-60 percent glass fiber; 1-10 percent binder (starch or phenolic resin) and 1-8 percent asphalt. With the Fourdrinier process, the product is made by mixing a homogeneous aqueous slurry of pourable consistency containing about 2-5 percent by weight solids of the constituents noted above, forming the slurry into a mat on the foraminous surface of the continuously moving open mesh chain of a Fourdrinier machine, dewatering the same and then drying the mat into a board form.

DETAILED DESCRIPTION OF THE INVENTION

As noted above, insulating board in accordance with the present invention has not only the capacity to absorb moisture as exemplified by wood fiber based board, cellulose fiber based board and perlite based board but the high permeability of fiberglass insulation contained therein provides the board with the ability to give up moisture as the board is passed through a cycle of absorption and desorption, whether it be on a daily or seasonable cycle.

The balance between the capacity to hold moisture and the ability to give up moisture can be varied by increasing and/or decreasing the amount of fiberglass and the permeance of the board relative to the amount of wood fiber or cellulose and the moisture capacitance of the board within the percentage limitations set forth.

A glass composite board made in accordance with the present invention is produced by a wet slurry process and preferably the Fourdrinier process, the same process employed to produce perlite based sheathing board with glass fiber added as a partial or full replacement for the expanded perlite. The board is made from a homogeneous mixture containing the ingredients listed in Table I at the indicated rate percentage levels, based upon the total weight of the mixture.

TABLE I

| Ingredient | General | By Weight % Example 1 | Example 2 | Example 3 |
|---|---|---|---|---|
| Perlite | 0-40% | 15% | — | — |
| Cellulose | 25-50% | 47% | 47% | 29% |
| Glass Fiber | 5-60% | 25% | 42% | 60% |
| Binder (Starch or Phenolic Resin | 1-10% | 8% | 8% | 8% |
| Asphalt | 1-8% | Asphalt Emulsion 3% Asphalt Hot Melt 2% | Asphalt Emulsion 3% | Asphalt Emulsion 3% |

The cellulose fiber in the product is customarily provided by using either wood pulp or recycled newsprint fiber and the glass fiber utilized can either be newly produced glass fiber or preferably recycled or scrap fiber which may usually be obtained at a savings since such fiber would ordinarily be destined for a landfill.

All of the constituents of the board with the exception of the glass fiber are mixed into a homogeneous aqueous slurry of pourable consistency, the glass fiber is added through a hydrapulper and a stock storage tank with agitating action. For example, the glass fiber may be added to a whirlpool or vortex of the fiber stock which feeds into the head box containing the conventional agitator and feeder. The slurry is formed into a mat on the continuously moving foraminous surface of the Fourdrinier, the mat is dewatered, and then the mat is dried into a board form. The aqueous slurry forming the mat has a solid consistency of about 2-8% by weight and preferably 3 ½% by weight.

Increasing the glass fiber in the formulation provides a board having increased permeance.

The partial or full replacement of glass fiber for expanded perlite results in insulating board with improved thermal properties and equivalent flexural strength when compared to perlite based sheathing board.

In Table II below are typical properties for samples produced in which there is no glass fiber and those produced in accordance with the compositions Examples 1, 2 and 3 of Table I.

TABLE II

| | K BTUs Btu in/hr ft$^2$ °F. | R/inch | Flex Strength psi |
|---|---|---|---|
| Perlite Based Board | 0.4 | 2.5 | 205-210 |
| Example 1 | 0.328 | 3.05 | 210-210 |
| Example 2 | 0.305 | 3.28 | 205-210 |
| Example 3 | 0.290 | 3.45 | 205-210 |

As noted by the data above, the addition of glass the composition board not only improves the thermal performance of the insulating board as compared to the perlite based board, but also improves its "R" value while having minimal effect on the flexural strength of the board. The fiber glass in the formulation of the insulating board also greatly improves the dimensional stability of the board. Test data has shown that the use of 25% glass fiber in the formulation (Example 1) improves the dimensional stability of the board over perlite based board not having fiber glass contained therein by 54%. Utilization of 42% glass fiber in the formulation (Example 2) increases the dimensional stability of the board produced over perlite based board having no glass fiber by 70%, and in the case of the formulation containing 60% glass fiber (Example 3) there is an 85% improvement of dimensional stability over perlite based board not containing glass fiber.

The glass composite board of the present invention, also compares very favorably to other sheathing materials as indicated in Table III below.

TABLE III

| | K BTUs in/hr ft$^2$ °F. | R/Inch |
|---|---|---|
| Composite Board Example 2 | 0.305 | |
| Perlite Based Board | 0.40 | |
| Wood Fiber Based Board | 0.40 | |
| Cellulose Fiber Based Board | 0.55 | |

In addition to the other favorable properties of glass composite board, the Table IV shows a comparison of flame spread/smoke development life safety of the formulations of Examples 1, 2 and 3 for the standard asphalt coated wood fiber based board.

TABLE IV

| | Flame | Smoke |
|---|---|---|
| Asphalt Coated Wood Fiber Based Board | 140 | 300 |
| Example 1 | 45 | 10 |
| Example 2 | 42 | 7 |
| Example 3 | 25 | 5 |

Listed in Table V are the Perm values of the formulations of Examples 1, 2 and 3 and asphalt coated perlite based board with fiber based board and cellulose based board with a facer. Any material with a Perm value of less than 5 is normally classified as being impermeable. The term "perm" is a unit of measure in the industry in connection with the permeability of a material, denoting its ability to transmit water vapor. A perm is equivalent to the transmission of 1 grain of water vapor per hour per square foot of the material in question, and is measured in accordance with known standard procedures, set forth, for example, in ASTM E 96 WVT.

TABLE V

|  | PERM |
| --- | --- |
| Example 1 | 36 |
| Example 2 | 42 |
| Example 3 | 67 |
| Asphalt Coated Perlite Based Board | 0.05 |
| Wood Fiber Based Board | <5 |
| Cellulose Fiber Based Board with Facer | >5 |

In Table VI below there is illustrated the moisture storage capacitance of Examples 1, 2 and 3 formulations.

TABLE VI

| Moisture Storage Capacitance where relative humidity is 100% | |
| --- | --- |
| Examples 1 and 2 | 1.55 lbs. water vapor per cu. ft. |
| Example 3 | .825 lbs. water vapor per cu. ft. |

While in the illustrations above the use of the glass composite board is directed to use as sheathing, obviously this board in view of its inherent properties can be used for various other purposes.

We claim:

1. A homogeneous thermal insulation board having a density of between 10-35 pcf., molded from an aqueous slurry and consisting essentially of 0-40% by weight perlite, 25-50% cellulose fiber, 5-50% glass fiber, 1-10% binder and 1-8% asphalt, the amount of perlite and cellulose fiber present in the board being such that the board has a permeance greater than 30 perms and a moisture storage capacity of at least 0.8 pounds of water vapor per cubic foot when the relative humidity is 100%.

2. An insulation board as defined in claim 1 wherein said cellulose fiber comprises recycled newsprint fiber.

3. An insulation board as defined in claim 1 or claim 2 wherein at least a portion of said glass fiber is glass fiber reclaimed from scrap.

4. A thermal insulation board as defined in claim 1, having a density of approximately 13 pcf., molded from an aqueous slurry and consisting essentially of approximately 15% perlite, approximately 47% cellulose, approximately 25% glass fiber, approximately 8% binder, approximately 3% asphalt emulsion, and approximately 2% asphalt hot melt.

5. A thermal insulation board as defined in claim 1, having a density of approximately 13 pcf., molded from an aqueous slurry and consisting essentially of approximately 47% cellulose, approximately 42% glass fiber, approximately 8% binder, and approximately 3% asphalt emulsion.

6. A homogeneous thermal insulation board as defined in claim 1 having density of approximately 13 pcf. molded from an aqueous slurry and consisting essentially of approximately 29% cellulose, approximately 60% glass fiber, approximately 8% binder starch, and approximately 3% asphalt emulsion.

7. A thermal insulation board as defined in claim 1 wherein the binder is selected from the group consisting of starch and phenolic resin.

8. A method of making a homogeneous thermal insulation board, which comprises making an aqueous slurry having a solids content consisting essentially of 0-40% by weight perlite, 25-50% cellulose fiber, 5-60% glass fiber, 1-10% binder, and 1-8% asphalt, forming a mat on a foraminous support from said slurry, dewatering the mat, and then drying the mat into board form, the amount of perlite and cellulose fiber present in the board being such that the board has a permeance greater than 30 perms and a moisture storage capacity of at least 0.8 pounds of water vapor per cubic foot when the relative humidity is 100%.

9. A method of making a homogeneous thermal insulation board as defined in claim 8 wherein the concentration of solids in said slurry is not less than approximately 2% by weight but is not greater than approximately 5% by weight.

* * * * *